United States Patent
Chang et al.

(10) Patent No.: US 10,411,257 B2
(45) Date of Patent: Sep. 10, 2019

(54) ELECTROLYTE AND BATTERY

(71) Applicant: INDUSTRIAL TECHNOLOGY RESEARCH INSTITUTE, Hsinchu (TW)

(72) Inventors: Chih-Ching Chang, Hsinchu (TW); Jason Fang, Taipei (TW); Wei-Hsin Wu, Hsinchu (TW); Chung-Hsiang Chao, Hsinchu (TW); Chia-Erh Liu, Zhudong Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 100 days.

(21) Appl. No.: 15/852,236

(22) Filed: Dec. 22, 2017

(65) Prior Publication Data

US 2018/0183055 A1   Jun. 28, 2018

Related U.S. Application Data

(60) Provisional application No. 62/439,604, filed on Dec. 28, 2016.

(30) Foreign Application Priority Data

Aug. 1, 2017   (TW) .............................. 106125864 A

(51) Int. Cl.
   *H01M 10/0565*   (2010.01)
   *H01M 10/0525*   (2010.01)
   (Continued)

(52) U.S. Cl.
   CPC ............. *H01M 4/485* (2013.01); *C01F 7/002* (2013.01); *C01F 7/02* (2013.01); *C01G 23/002* (2013.01);
   (Continued)

(58) Field of Classification Search
   CPC ......... H01M 10/0525; H01M 10/0565; H01M 10/0562; H01M 2300/0068; H01M 2300/0091
   See application file for complete search history.

(56) References Cited

U.S. PATENT DOCUMENTS

6,664,006 B1   12/2003   Munshi
8,182,943 B2   5/2012   Visco et al.
(Continued)

FOREIGN PATENT DOCUMENTS

| CN | 105098234 A | 11/2015 |
|---|---|---|
| CN | 105594051 A | 5/2016 |
| CN | 106299467 A | 1/2017 |

OTHER PUBLICATIONS

Abraham et al., "Inorganic-Organic Composite Solid Polymer Electrolytes", Journal of The Electrochemical Society, vol. 147, No. 4, 2000, pp. 1251-1256.
(Continued)

*Primary Examiner* — Stewart A Fraser
(74) *Attorney, Agent, or Firm* — Birch, Stewart, Kolasch & Birch, LLP

(57) ABSTRACT

An electrolyte is provided, which includes (a) 100 parts by weight of oxide-based solid state inorganic electrolyte, (b) 20 to 70 parts by weight of $[Li(-OR^1)_n{}^-OR^2]Y$, wherein $R^1$ is $C_{1-4}$ alkylene group, $R^2$ is $C_{1-4}$ alkyl group, n is 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SO_2CF_3)_3^-$, $N(SO_2CF_3)_2^-$, $SCN^-$, $CF_3CF_2SO_3^-$, $C_6F_5SO_3^-$, $CF_3CO_2^-$, $SO_3F^-$, $B(C_6H_5)_4^-$, $CF_3SO_3^-$, or a combination thereof, (c) 1 to 10 parts by weight of nano oxide, and (d) 1 to 20 parts by weight of binder. The electrolyte can be disposed between a positive electrode and a negative electrode to form a battery.

14 Claims, 9 Drawing Sheets

(51) Int. Cl.
| | |
|---|---|
| *H01M 4/485* | (2010.01) |
| *C01G 25/00* | (2006.01) |
| *C01G 23/00* | (2006.01) |
| *C01F 7/00* | (2006.01) |
| *C01G 25/02* | (2006.01) |
| *C01G 23/04* | (2006.01) |
| *C01F 7/02* | (2006.01) |
| *H01M 4/62* | (2006.01) |
| *H01M 10/0562* | (2010.01) |

(52) U.S. Cl.
CPC ........... *C01G 23/04* (2013.01); *C01G 25/006* (2013.01); *C01G 25/02* (2013.01); *H01M 4/622* (2013.01); *H01M 10/0525* (2013.01); *H01M 10/0562* (2013.01); *H01M 10/0565* (2013.01); *H01M 2300/0068* (2013.01); *H01M 2300/0071* (2013.01); *H01M 2300/0091* (2013.01)

(56) References Cited

U.S. PATENT DOCUMENTS

| | | | |
|---|---|---|---|
| 2013/0266842 A1 | 10/2013 | Woehrle et al. | |
| 2015/0229012 A1 | 8/2015 | Toyoda et al. | |
| 2016/0204468 A1* | 7/2016 | Makino | C08F 290/06 429/310 |
| 2016/0359194 A1* | 12/2016 | Meguro | H01M 10/0562 |
| 2017/0005367 A1* | 1/2017 | Van Berkel | H01M 10/0565 |
| 2018/0166759 A1* | 6/2018 | Zhamu | H01M 12/06 |

OTHER PUBLICATIONS

Fu et al., "Flexible, solid-state, ion-conducting membrane with 3D garnet nanofiber networks for lithium batteries", PNAS Early Edition, 2016, pp. 1-6.

Ito et al., "Application of quasi-solid-state silica nanoparticles-ionic liquid composite electrolytes to all-solid-state lithium secondary battery", ELSEVIER, Journal of Power Sources, vol. 208, 2012, pp. 271-275.

Kim et al., "A hybrid solid electrolyte for flexible solid-state sodium batteries", Energy & Environmental Science, vol. 8, No. 12, Dec. 2015, pp. 3589-3596.

Le et al., "Composite Gel Polymer Electrolyte Based on Poly(vinylidene fluoride-hexafluoropropylene) (PVDF-HFP) with Modified Aluminum-Doped Lithium Lanthanum Titanate (A-LLTO) for High-Performance Lithium Rechargeable Batteries", ACS Applied Materials & Interfaces, vol. 8, 2016, pp. 20710-20719.

Lim et al., "Ceramic-Based Composite Solid Electrolyte for Lithium-Ion Batteries", ChemPlusChem Communications, vol. 80, 2015, pp. 1100-1103.

Matsuo et al., "Bipolar stacked quasi-all-solid-state lithium secondary batteries with output cell potentials of over 6 V", SCIENTIFIC REPORTS, Aug. 15, 2014, pp. 1-5.

Nakajima et al., "Lithium Ion Conductive Glass Ceramics: Properties and Application in Lithium Metal Batteries", Symposium on Energy Storage Beyond Lithium Ion; Materials Perspective, Oct. 7-8, 2010, pp. 1-27.

Rangasamy et al., "A high conductivity oxide-sulfide composite lithium superionic conductor", Journal of Materials Chemistry A, vol. 2, No. 12, Mar. 28, 2014, pp. 4111-4116.

Shimano et al., "Preparation of Nanohybrid Solid-State Electrolytes with Liquidlike Mobilities by Solidifying Ionic Liquids with Silica Particles", Chem. Mater., vol. 19, 2007, pp. 5216-5221.

Tamura et al., "Physicochemical Properties of Glyme-Li Salt Complexes as a New Family of Room-temperature Ionic Liquids", Chem. Lett., vol. 39, 2010. pp. 753-755.

Wang et al., "Conductivity studies on ceramic $Li_{1.3}Al_{0.3}Ti_{1.7}(PO_4)_3$-filled PEO-based solid composite polymer electrolytes", Journal of Power Sources, vol. 159, 2006, pp. 690-701.

Wang et al., "Ion-conducting polymer electrolyte based on poly-(ethylene oxide) complexed with $Li_{1.3}Al_{0.3}Ti_{1.7}(PO_4)_3$ salt", Materials Chemistry and Physics, vol. 92, 2005, pp. 354-360.

Yoshida et al., "Oxidative-Stability Enhancement and Charge Transport Mechanism in Glyme-Lithium Salt Equimolar Complexes", Journal of the American Chemical Society, vol. 133, 2011, pp. 13121-13129.

Huang et al., "A Low Cost Composite Quasi-solid Electrolyte of LATP, TEGDME, and LiTFSI for Rechargeable Lithium Batteries," Chin. Phys. B, vol. 26, No. 6, 2017 (Published online May 10, 2017), pp. 068201-1 to 068201-6.

Taiwanese Office Action and Search Report, dated Feb. 5, 2018, for Taiwanese Application No. 106125864.

* cited by examiner

ELECTROLYTE AND BATTERY

CROSS REFERENCE TO RELATED APPLICATIONS

This application claims the benefit of U.S. Provisional Application No. 62/439,604, filed on Dec. 28, 2016, the entirety of which is incorporated by reference herein. The present application is based on, and claims priority from, Taiwan Application Serial Number 106125864, filed on Aug. 1, 2017, the disclosure of which is hereby incorporated by reference herein in its entirety.

TECHNICAL FIELD

The technical field relates to a battery and an electrolyte utilized in the battery.

BACKGROUND

In conventional liquid electrolyte lithium ion batteries, the energy storage cost per unit is high due to low gravimetric energy density and limited cycle times. However, unilaterally increasing the energy density of the batteries can easily induce serial safety problems in the electrochemical batteries, such as liquid leakage, battery swelling, heating, fuming, burning, explosion, and the like. As such, suitable applications for batteries with the above safety issues are seriously limited. Accordingly, a novel electrolyte is called for to solve the above problems and simultaneously achieve an optimal balance of energy, lifespan, cost, and safety.

SUMMARY

One embodiment of the disclosure provides an electrolyte, including: (a) 100 parts by weight of oxide-based solid state inorganic electrolyte; (b) 20 to 70 parts by weight of [Li(—OR$^1$)$_n$—OR$^2$]Y, wherein R$^1$ is C$_{1-4}$ alkylene group, R$^2$ is C$_{1-4}$ alkyl group, n is 2 to 100, and Y is PF$_6^-$, BF$_4^-$, AsF$_6^-$, SbF$_6^-$, ClO$_4^-$, AlCl$_4^-$, GaCl$_4^-$, NO$_3^-$, C(SO$_2$CF$_3$)$_3^-$, N(SO$_2$CF$_3$)$_2^-$, SCN$^-$, CF$_3$CF$_2$SO$_3^-$, C$_6$F$_5$SO$_3^-$, CF$_3$CO$_2^-$, SO$_3$F$^-$, B(C$_6$H$_5$)$_4^-$, CF$_3$SO$_3^-$, or a combination thereof; (c) 1 to 10 parts by weight of nano oxide; and (d) 1 to 20 parts by weight of binder.

One embodiment of the disclosure provides a battery, including a positive electrode, a negative electrode, and the described electrolyte disposed between the positive electrode and the negative electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
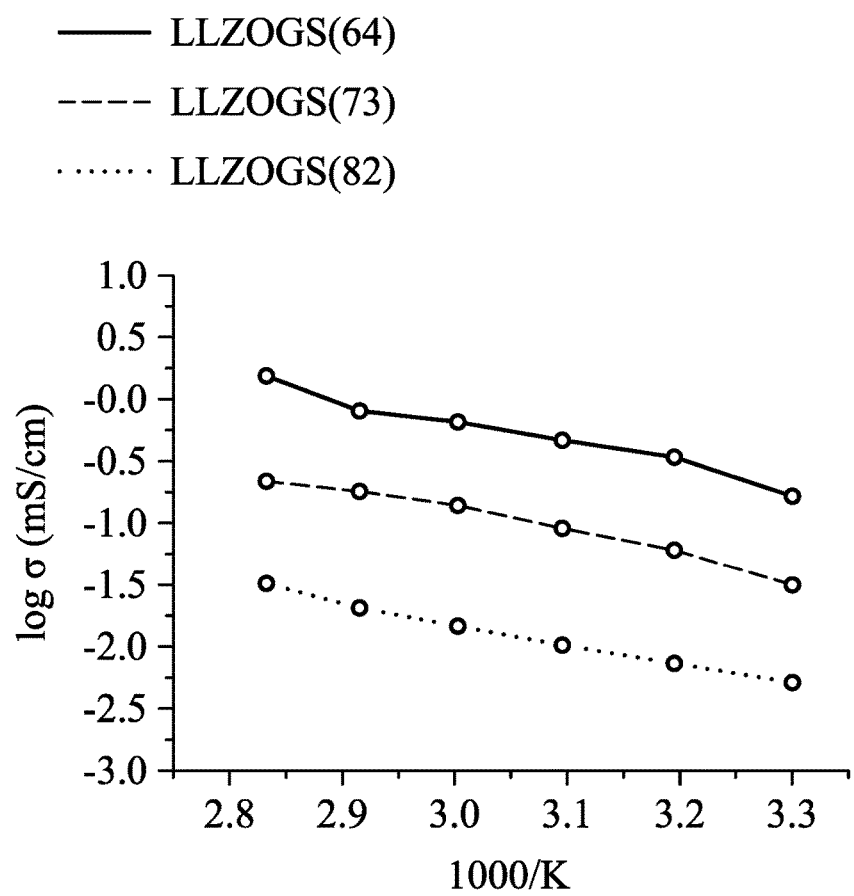
FIG. 1 shows plots of log σ versus 1000/K of composite electrolyte films in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides an electrolyte, which includes (a) 100 parts by weight of oxide-based solid state inorganic electrolyte, (b) 20 to 70 parts by weight of [Li(—OR$^1$)$_n$—OR$^2$]Y, wherein R$^1$ is C$_{1-4}$ alkylene group, R$^2$ is C$_{1-4}$ alkyl group, n is 2 to 100, and Y is PF$_6^-$, BF$_4^-$, AsF$_6^-$, SbF$_6^-$, ClO$_4^-$, AlCl$_4^-$, GaCl$_4^-$, NO$_3^-$, C(SO$_2$CF$_3$)$_3^-$, N(SO$_2$CF$_3$)$_2^-$, SCN$^-$, CF$_3$CF$_2$SO$_3^-$, C$_6$F$_5$SO$_3^-$, CF$_3$CO$_2^-$, SO$_3$F$^-$, B(C$_6$H$_5$)$_4^-$, CF$_3$SO$_3^-$, or a combination thereof, (c) 1 to 10 parts by weight of nano oxide, and (d) 1 to 20 parts by weight of binder. The electrolyte can be quasi solid state film-like or solid state film-like. In one embodiment, the oxide-based solid state inorganic electrolyte includes lithium lanthanum zirconium oxide, lithium lanthanum titanium oxide, lithium aluminum titanium phosphate, and the like, or a combination thereof.

Too little [Li(—OR$^1$)$_n$—OR$^2$]Y may result in an overly low ionic conductivity of the electrolyte film. Too much [Li(—OR$^1$)$_n$—OR$^2$]Y may result in a poor mechanical strength of the electrolyte film. An overly small n value may result in a poor mechanical strength of the electrolyte film. An overly large n value may result in an overly low ionic conductivity of the electrolyte film at room temperature. In one embodiment, R$^1$ is ethylene group, R$^2$ is methyl group, n is 4, and Y is N(SO$_2$CF$_3$)$_2^-$ for [Li(—OR$^1$)$_n$—OR$^2$]Y.

Too little nano oxide causes a low film formability of the electrolyte. Too much nano oxide causes the poor ionic conductivity of the electrolyte. In one embodiment, the nano oxide includes silicon oxide, aluminum oxide, cerium oxide, titanium oxide, or a combination thereof. In one embodiment, the nano oxide has a size of 5 nm to 100 nm. Nano oxide that is too small may not be easily dispersed in the electrolyte. Nano oxide that is too large may result in the electrolyte having poor ionic conductivity.

Too little binder cannot form the electrolyte film. Too much binder may form a hard and brittle film. In one embodiment, the binder includes polyvinylidene difluoride, polytetrafluoroethylene, polyvinyl alcohol, polyethylene glycol, carboxymethyl cellulose, styrene-butadiene rubber, polyacrylate, polyacrylonitrile, or a combination thereof.

In one embodiment, R$^2$(—OR$^1$)$_n$—OR$^2$ is mixed with LiY to form [Li(—OR$^1$)$_n$—OR$^2$]Y, and the nano oxide is then added thereto for forming a quasi solid state electrolyte. The oxide-based solid state inorganic electrolyte is then added to the quasi solid state electrolyte to be mixed, and the binder is then added thereto. As such, an organic-inorganic composite electrolyte is formed, which can be compacted into a film (composite electrolyte film).

Alternatively, the electrolyte may further includes (e) 1 to 20 parts by weight of hyper-branched polymer, and the surface of the oxide-based solid state inorganic electrolyte is modified by the hyper-branched polymer. The hyper-branched polymer may improve the organic-inorganic compatibility and enhancing the ionic conductivity of the composite electrolyte film. Too much hyper-branched polymer may result in a poor ionic conductivity of the electrolyte. In one embodiment, the hyper-branched polymer and the surface of the oxide-based solid state inorganic electrolyte have bondings therebetween. The hyper-branched polymer is formed by a cross-linking reaction of a prepolymer and a basic promoter, and the prepolymer is formed by a reaction of a precursor containing a maleimide functional group and a precursor of a Lewis base. For example, the precursor containing a maleimide functional group may have a structure of

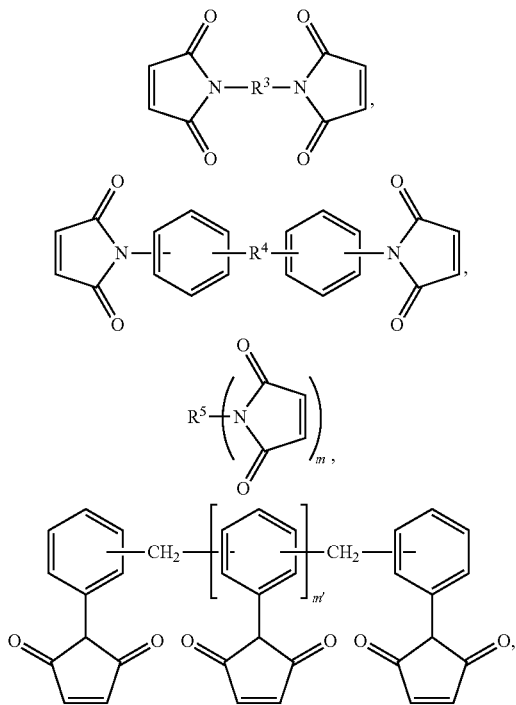

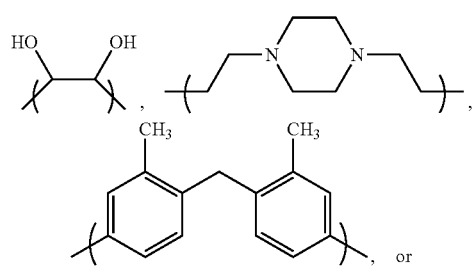

or a combination thereof, wherein $R^3$ is —CH$_2$NHCH$_2$—, —C$_2$H$_4$NHC$_2$H$_4$—, —C(O)CH$_2$—, —CH$_2$OCH$_2$—, —C(O)—, —O—, —S—, —S—S—, —S(O)—, —CH$_2$S(O)CH$_2$—, —(O)S(O)—, —CH$_2$(C$_6$H$_4$)CH$_2$—, —CH$_2$(C$_6$H$_4$)O—, —(CH$_2$CH(CH$_3$)O)—, phenylene group, biphenylene group, C$_{2-8}$ alkylene group,

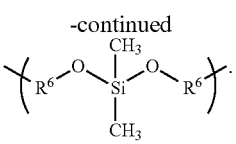

Each $R^6$ is independently —(CH$_2$CH$_2$)O—, phenylene group, or C$_{2-8}$ alkylene group. $R^4$ is C$_{2-8}$ alkylene group, —C(O)—, —C(CH$_3$)$_2$—, —O—, —S—, —S—S—, —S(O)—, —(O)S(O)—, or —O(C$_6$H$_4$)C(CF$_3$)$_2$(C$_6$H$_4$)O—.

When m=3, $R^5$ is

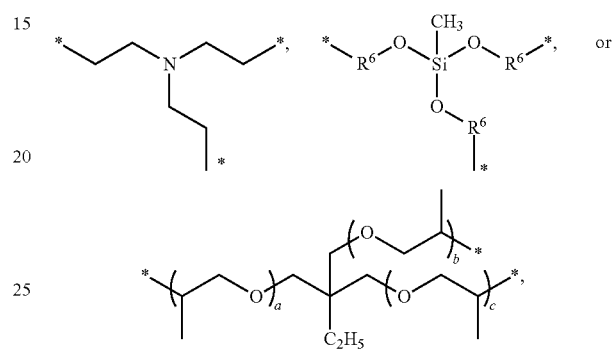

wherein each $R^6$ is independently —(CH$_2$CH$_2$)O—, phenylene group, or C$_{2-8}$ alkylene group. a+b+c=5 or 6, and each of a, b, and c is greater than or equal to 1. When m=4, $R^5$ is

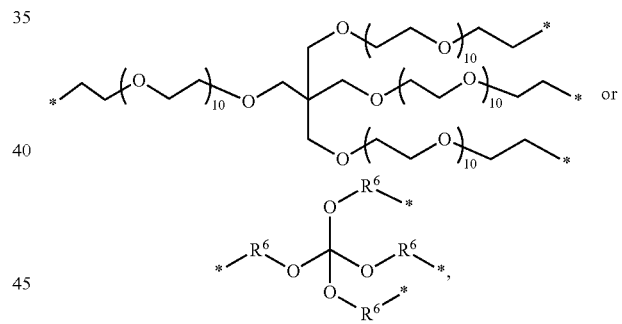

and each $R^6$ is independently of —(CH$_2$CH$_2$)O—, phenylene group, or C$_{2-8}$ alkylene group. When m=8, $R^5$ is

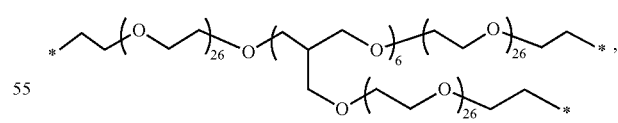

wherein m'=2-5.

The precursor of Lewis base may have a structure of

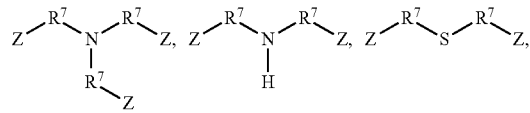

-continued

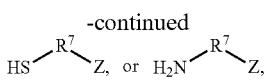

wherein Z is —SH or —NH$_2$, and R$^7$ is

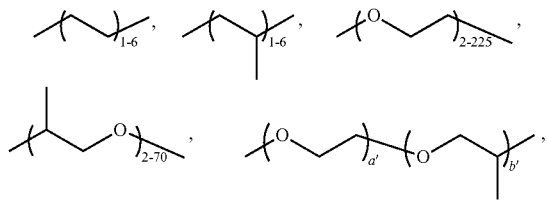

wherein a'+b'=45, or

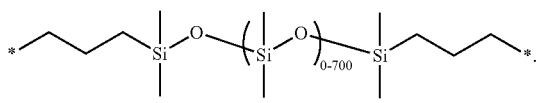

The basic promoter may have a structure of

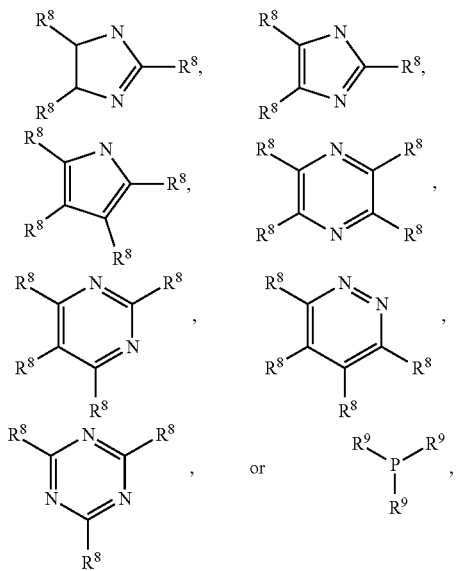

wherein each R$^8$ is independently H, alkyl group, alkenyl group, phenyl group, dimethylamino group, halogen, or —NH$_2$, and wherein each R$^9$ is independently alkyl group, alkenyl group, phenyl group, or halogen.

In one embodiment, a battery includes a positive electrode, a negative electrode, and the electrolyte disposed between the positive electrode and the negative electrode. In one embodiment, the positive electrode material may include elementary sulfur, organic sulfide, or sulfur carbon composite. In addition, the positive electrode material can be lithium oxide, lithium sulfide, lithium selenide, lithium telluride, lithium phosphide, lithium silicide, lithium aluminide, or lithium boride of aluminum, vanadium, titanium, chromium, copper, molybdenum, niobium, iron, nickel, cobalt, or magnesium, or a combination thereof. In one embodiment, the negative electrode material may include metal lithium, lithium alloy, meso carbon micro bead (MCMB), vapor grown carbon fiber (VGCF), carbon nanotube (CNT), graphene, coke, graphite, carbon black, acetylene black, carbon fiber, glassy carbon, lithium titanium oxide, silicon, silicon-based alloy, tin, tin-based alloy, or a combination thereof.

In one embodiment, the surface of the positive electrode is covered by a gel type electrolyte, and the gel type electrolyte includes the hyper-branched polymer, lithium salt, and solvent. The gel type electrolyte is disposed between the electrolyte and the positive electrode to solve the problem such as the internal micro-short resulting from a high-energy positive electrode. The positive electrode and the gel type electrolyte may have a weight ratio of 100:0.01 to 100:1. The lithium salt can be LiPF$_6$, LiBF$_4$, LiAsF$_6$, LiSbF$_6$, LiClO$_4$, LiAlCl$_4$, LiGaCl$_4$, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, or a combination thereof. The solvent can be γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof. In one embodiment, the surface of the negative electrode is covered by the gel type electrolyte, and the gel type electrolyte includes the hyper-branched polymer, the lithium salt, and the solvent. The gel type electrolyte is disposed between the electrolyte and the negative electrode to solve problems such as internal micro-shorts. The negative electrode and the gel type electrolyte may have a weight ratio of 100:0.01 to 100:1. In another embodiment, both the surface of the positive electrode and the surface of the negative electrode are respectively covered by the gel type electrolyte. The positive electrode and the gel type electrolyte may have a weight ratio of 100:0.01 to 100:1, and the negative electrode and the gel type electrolyte may have a weight ratio of 100:0.01 to 100:1. The hyper-branched polymer in the gel type electrolyte is similar to that of the organic-inorganic composite electrolyte, which is also formed by a cross-linking reaction of the prepolymer and the basic promoter, and the prepolymer is formed by a reaction of the precursor containing a maleimide functional group and the precursor of a Lewis base. The precursor containing a maleimide functional group, the precursor of the Lewis base, and the basic promoter are similar to those described above, and the related description thereof is omitted here.

Alternatively, the battery includes a positive electrode, a negative electrode, the electrolyte attached to the negative electrode, and an electrolyte liquid disposed between the electrolyte and the negative electrode. In one embodiment, the battery may further include a separator film between the electrolyte and the negative electrode. The electrolyte liquid can be a non-aqueous electrolyte liquid, and the non-aqueous electrolyte liquid can be a non-aqueous electrolyte of metal salt. The non-aqueous electrolyte liquid may include metal salt and solvent, wherein the metal salt may include LiPF$_6$, LiBF$_4$, LiAsF$_6$, LiSbF$_6$, LiClO$_4$, LiAlCl$_4$, LiGaCl$_4$, LiNO$_3$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, or a combination thereof. The solvent may include ethylene carbonate, propylene carbonate, butylene carbonate, dipropyl carbonate, anhydride, N-methylpyrrolidone, N-methylformamide, dimethylformamide, γ-butyl lactone, acetonitrile, dimethyl sulfoxide, dimethyl sulfite, 1,2-dimethoxyethane, 1,2-dibutoxyethane, tetrahydrofuran, 2-methyltetrahydrofuran, epoxypropane, methyl acetate, methyl butyrate, ethyl butyrate, methyl propionate, ethyl propionate, dimethyl carbonate, diethyl carbonate, ethyl methyl carbonate, or a combination thereof.

The separator film can be polyethylene, polypropylene, ceramic material, or a combination thereof.

The inorganic based and organic based solid state electrolytes for the conventional solid state batteries have problems such as high interface impedance, difficult processes, low ionic conductivity, and insufficient mechanical strength. The organic-inorganic composite electrolyte in the above embodiments may provide better electrochemical stability, mechanical strength, and adhesion strength. The organic-inorganic composite may increase the compatibility between the electrode and the electrolyte interface. In addition, the surface of the oxide-based solid state inorganic electrolyte can be modified by the hyper-branched polymer to improve the efficiency of the lithium ionic conductivity.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

0.222 g of tetra(ethylene glycol)dimethyl ether (TEGDME), 0.287 g of lithium bis(trifluoromethylsulphonyl)imide (LiTFSI), and 0.056 g of $SiO_2$ (Aerosil 812, commercially available from Degussa) were mixed to form a quasi solid state electrolyte.

50 parts by weight of $Li_7La_3Zr_2O_{12}$ (LLZO, commercially available from MTI Corporation) and 50 parts by weight of the quasi solid state electrolyte were mixed, and 7 parts by weight of polytetrafluoroethylene (PTFE micropowder, commercially available from EF Materials Industries Inc.) was then added to the mixture. The mixture was roller-compacted but could not form a composite electrolyte film. Alternatively, 60 parts by weight of $Li_7La_3Zr_2O_{12}$ and 40 parts by weight of the quasi solid state electrolyte were mixed, and 7 parts by weight of the PTFE micropowder was then added to the mixture. The mixture was roller-compacted to form a composite electrolyte film (LLZOGS(64)) with a thickness of 200 micrometers. Alternatively, 70 parts by weight of $Li_7La_3Zr_2O_{12}$ and 30 parts by weight of the quasi solid state electrolyte were mixed, and 7 parts by weight of the PTFE micropowder was then added to the mixture. The mixture was roller-compacted to form a composite electrolyte film (LLZOGS(73)) with a thickness of 200 micrometers. Alternatively, 80 parts by weight of $Li_7La_3Zr_2O_{12}$ and 20 parts by weight of the quasi solid state electrolyte were mixed, and 7 parts by weight of the PTFE micropowder was then added to the mixture. The mixture was roller-compacted to form a composite electrolyte film (LLZOGS(82)) with a thickness of 200 micrometers. Alternatively, 100 parts by weight of $Li_7La_3Zr_2O_{12}$ and 7 parts by weight of the PTFE micropowder were mixed, and the mixture was roller-compacted to form a composite electrolyte film with a thickness of 300 micrometers. The thickness of this composite electrolyte film could not be further reduced by the roller compaction, and this composite electrolyte film had an ionic conductivity at room temperature of only 0.00015 mS/cm. The ionic conductivity ($\sigma$) of the composite electrolyte film was obtained by AC impedance analysis. Alternating current was applied to the composite electrolyte film, and the composite electrolyte film was scanned from 7 MHz to 100 MHz to obtain a Nyquist frequency diagram. An intercept of the real impedance (Z') was obtained when the virtual impedance (Z'') was zero, and the ionic conductivity was calculated by following equation: $\sigma=L/(AR)$, wherein L is a distance between two electrodes, R is the electrolyte impedance, and A is the electrode area. The ionic conductivities ($\sigma$, mS/cm) of the composite electrolyte films at different temperatures (K) were measured and the conductivity plots of log $\sigma$ versus 1000/K of the composite electrolyte films were shown in FIG. 1.

Example 2

Figure 2:
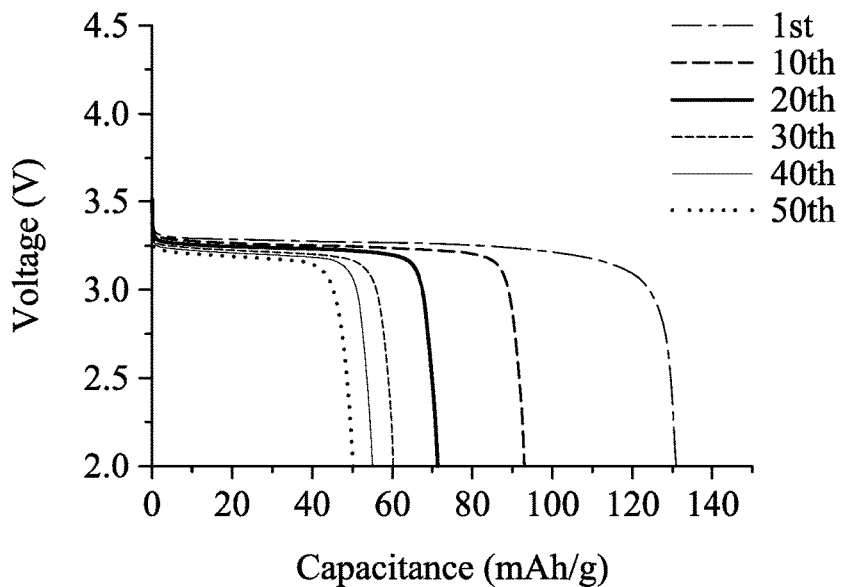
FIGS. 2 and 3 show discharge curves of different batteries in embodiments of the disclosure.

25 parts by weight of polyethylene glycol (commercially available from Sigma-Aldrich), 70 parts by weight of lithium iron phosphate, and 5 parts by weight of conductive carbon (Super P, commercially available from TIMCAL) were mixed, then coated on an aluminum foil, and then dried to serve as a positive electrode. Aqueous solution of LiTFSI (commercially available from 3M) and polyethylene glycol was coated on a support and then dried, and the support was removed to obtain a polymer electrolyte film. In the aqueous solution, the lithium atoms of the LiTFSI and the oxygen atoms of the polyethylene glycol have an atomic ratio (Li/O) of about 10. The polymer electrolyte film was disposed between the positive electrode and a lithium foil (serving as a negative electrode) to complete a battery. Subsequently, the battery was tested by cyclic charge/discharge (0.3 C charge/0.3 C discharge) 50 times at 55° C. to obtain discharge curves, as shown in FIG. 2. In this Example, the electrolyte was mainly composed of LiTFSI, the capacitance of the battery was rapidly decayed after the repeated charge/discharge cycles, and the discharge plateau of the battery was reduced.

Figure 3:
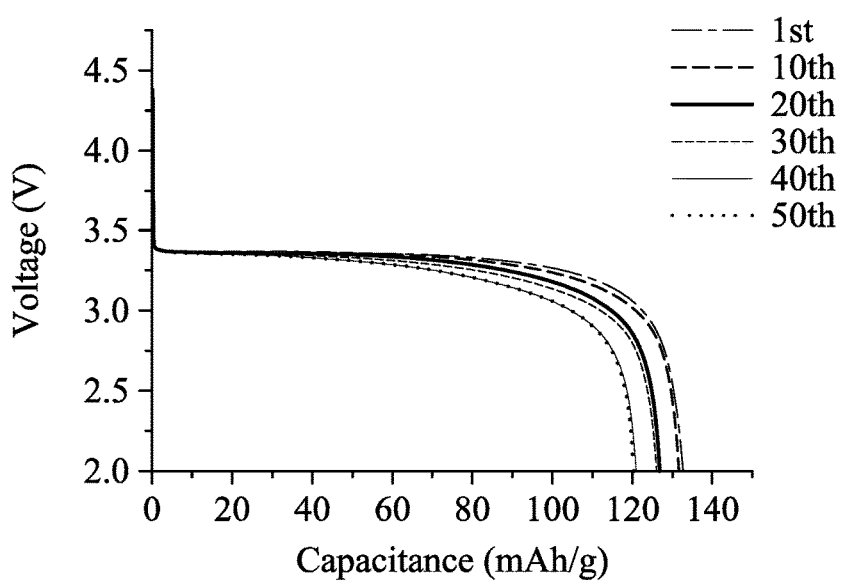

Alternatively, the composite electrolyte film in Example 1 (containing 40 parts by weight of the quasi solid state electrolyte and 60 parts by weight of $Li_7La_3Zr_2O_{12}$) was disposed between the positive electrode and a lithium foil (serving as a negative electrode) to complete a battery. Subsequently, the battery was tested by cyclic charge/discharge (0.3 C charge/0.3 C discharge) 50 times at 55° C. to obtain discharge curves, as shown in FIG. 3. In this example, the electrolyte includes LiTFSI, the TEGDME, $SiO_2$, and $Li_7La_3Zr_2O_{12}$, the capacitance of the battery was not obviously decayed after the repeated charge/discharge cycles (50 times), and the discharge plateau of the battery was relative stable.

Example 3

Figure 4:
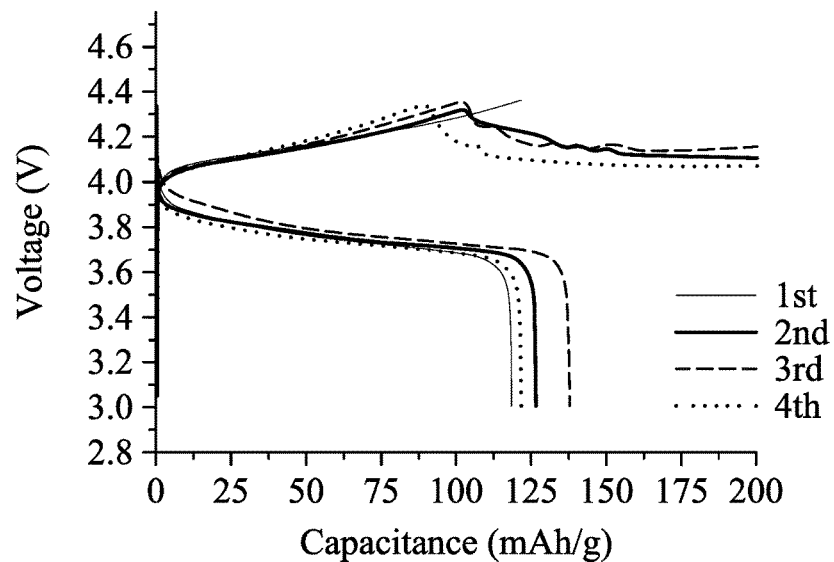
FIGS. 4 and 5 show charge-discharge curves of different batteries in embodiments of the disclosure.

3 parts by weight of polyvinylidene difluoride (PVDF, commercially available from Solvay), 95 parts by weight of high voltage lithium cobalt oxide (983HA, commercially available from Pulead Technology Industry Co., Ltd.), and 2 parts by weight of conductive carbon (Super P, commercially available from TIMCAL) were mixed, then coated on an aluminum foil, and then dried to serve as a high-energy positive electrode. The composite electrolyte film in Example 1 (containing 40 parts by weight of the quasi solid state electrolyte and 60 parts by weight of $Li_7La_3Zr_2O_{12}$) was disposed between the high-energy positive electrode and a lithium foil (serving as a negative electrode) to complete a battery. Subsequently, the battery was tested by cyclic charge/discharge (0.1 C charge/0.1 C discharge) at 55° C. to obtain charge-discharge curves, as shown in FIG. 4. As shown in the charge curves in FIG. 4, an internal micro-short occurred in the battery.

1.19 g of the precursor containing a maleimide functional group (BMI1100, commercially available from Daiwakasei Industry, Co., Ltd.) and 1.953 g of Lewis base (Jeffamine ED900, commercially available from Huntsman) were evenly mixed in a liquid organic electrolyte (1.1M $LiPF_6$ solution of a co-solvent of ethylene carbonate/propylene carbonate/diethyl carbonate (3/2/5, v/v/v)) and then reacted at room temperature overnight to form a prepolymer. Subsequently, 0.098 g of basic promoter 2,4-dimethyl-2-imidazoline was added to the prepolymer to perform an in-situ polymerization, thereby forming a gel type electrolyte with a solid content of 8 wt %.

Figure 5:
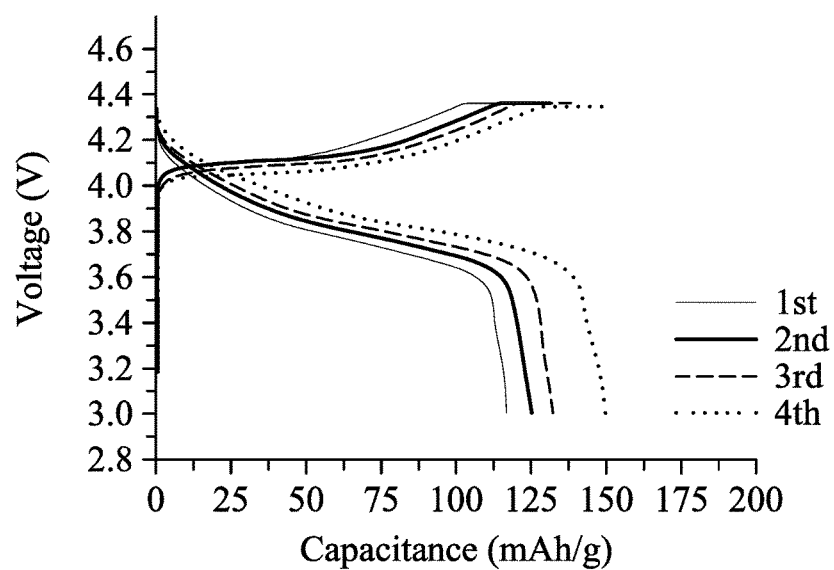

Subsequently, the high-energy positive electrode was dipped into the gel type electrolyte, and the gel type electrolyte permeated into surface pores of the high-energy positive electrode. Thereafter, the high-energy positive electrode having a surface covered by the gel type electrolyte was weighed to measure the electrolyte weight. The composite electrolyte film in Example 1 (containing 40 parts by weight of the quasi solid state electrolyte and 60 parts by weight of $Li_7La_3Zr_2O_{12}$) was disposed between the high-energy positive electrode and a lithium foil (serving as a negative electrode) to complete a battery. The $Li_7La_3Zr_2O_{12}$ in the composite electrolyte film and the gel type electrolyte have a weight ratio of 100:1. The gel type electrolyte was disposed between the high-energy positive electrode and the composite electrolyte film. Subsequently, the battery was tested by cyclic charge/discharge (0.1 C charge/0.1 C discharge) at 35° C. to obtain charge-discharge curves, as shown in FIG. 5. As shown in the charge curves in FIG. 5, internal micro-short could be mitigated by the positive electrode with the surface covered by the gel type electrolyte.

Example 4

Figure 6:
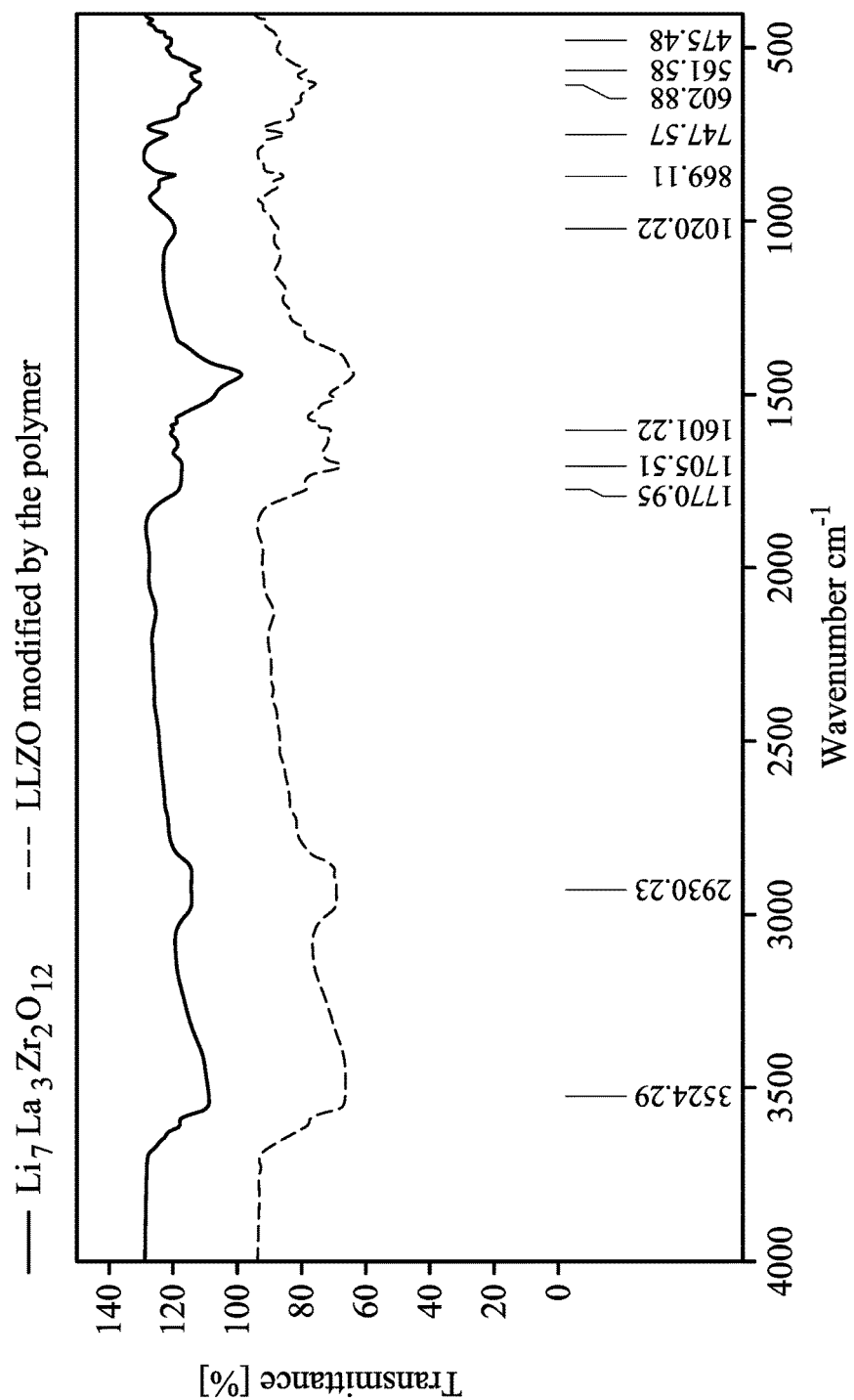
FIG. 6 shows an IR spectrum of Li$_7$La$_3$Zr$_2$O$_{12}$ with a surface modified by a polymer in one embodiment of the disclosure.

1.19 g of the precursor containing a maleimide functional group (BMI1100, commercially available from Daiwakasei Industry, Co., Ltd.) and 1.953 g of Lewis base (Jeffamine ED900, commercially available from Huntsman) were evenly mixed in dimethylacetamide (DMAc) and then reacted to form a prepolymer. Subsequently, 0.098 g of basic promoter 2,4-dimethyl-2-imidazolone was added to the DMAc to form a hyper-branched polymer solution. 60 parts by weight of $Li_7La_3Zr_2O_{12}$ was added to the hyper-branched polymer solution to be mixed, centrifuged and washed, and then dried to obtain $Li_7La_3Zr_2O_{12}$ with a surface modified by the hyper-branched polymer. As shown in the result of the thermogravimetric analysis (TGA), the $Li_7La_3Zr_2O_{12}$ with a surface modified by the hyper-branched polymer included 1.6 wt % of the hyper-branched polymer. The $Li_7La_3Zr_2O_{12}$ with a surface modified by the hyper-branched polymer and 40 parts by weight of the quasi solid state electrolyte in Example 1 were mixed, and 7 parts by weight of the PTFE micropowder was then added to the mixture. The mixture was then roller-compacted into a composite electrolyte film with a thickness of 200 micrometers. The $Li_7La_3Zr_2O_{12}$ and the $Li_7La_3Zr_2O_{12}$ with the surface modified by the hyper-branched polymer were respectively analyzed by IR, as shown in FIG. 6. The $Li_7La_3Zr_2O_{12}$ with the surface modified by the hyper-branched polymer had absorption peaks (C=O bonding signal) between 1600 $cm^{-1}$ and 1770 $cm^{-1}$, it means that the hyper-branched polymer (containing the C=O bonding) modified the surface of the $Li_7La_3Zr_2O_{12}$. The original $Li_7La_3Zr_2O_{12}$ has no absorption peak between 1600 $cm^{-1}$ and 1770 $cm^{-1}$.

Figure 7:
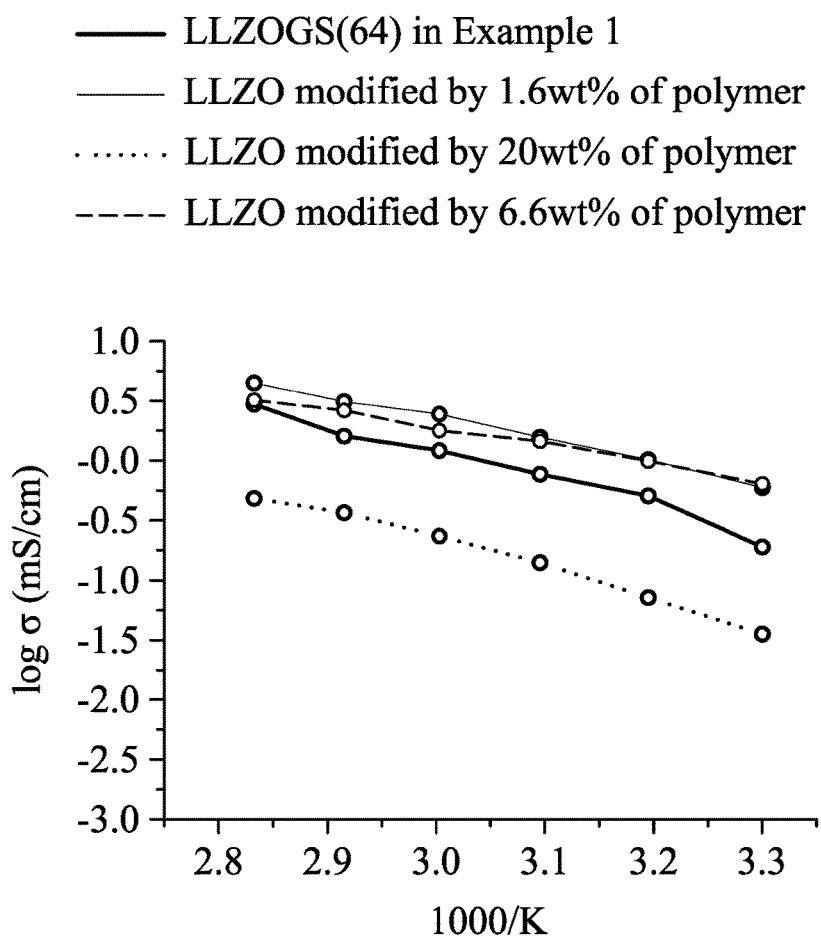
FIG. 7 shows plots of log σ versus 1000/K of composite electrolyte films in one embodiment of the disclosure.

The above experiment was repeated with the difference of tuning the hyper-branched polymer solution amount. As shown in the result of the thermogravimetric analysis (TGA), the composite electrolyte film included the $Li_7La_3Zr_2O_{12}$ with a surface modified by the hyper-branched polymer containing 6.6 wt % of the hyper-branched polymer. The above experiment was repeated again with the difference of tuning the hyper-branched polymer solution amount. As shown in the result of the thermogravimetric analysis (TGA), the composite electrolyte film included the $Li_7La_3Zr_2O_{12}$ with a surface modified by the hyper-branched polymer containing 20 wt % of the hyper-branched polymer. The ionic conductivities (a, mS/cm) of the different composite electrolyte films at different temperatures (K) were measured to plot lines of log σ versus 1000/K of the composite electrolyte films, as shown in FIG. 7. In FIG. 7, the composite electrolyte film containing the $Li_7La_3Zr_2O_{12}$ with a surface modified by the appropriate amount of the hyper-branched polymer had an ionic conductivity higher than that of the composite electrolyte film containing the $Li_7La_3Zr_2O_{12}$. However, the composite electrolyte film containing the $Li_7La_3Zr_2O_{12}$ with a surface modified by the overly high amount of the hyper-branched polymer had an ionic conductivity lower than that of the composite electrolyte film containing the $Li_7La_3Zr_2O_{12}$.

Example 5

Figure 8A:
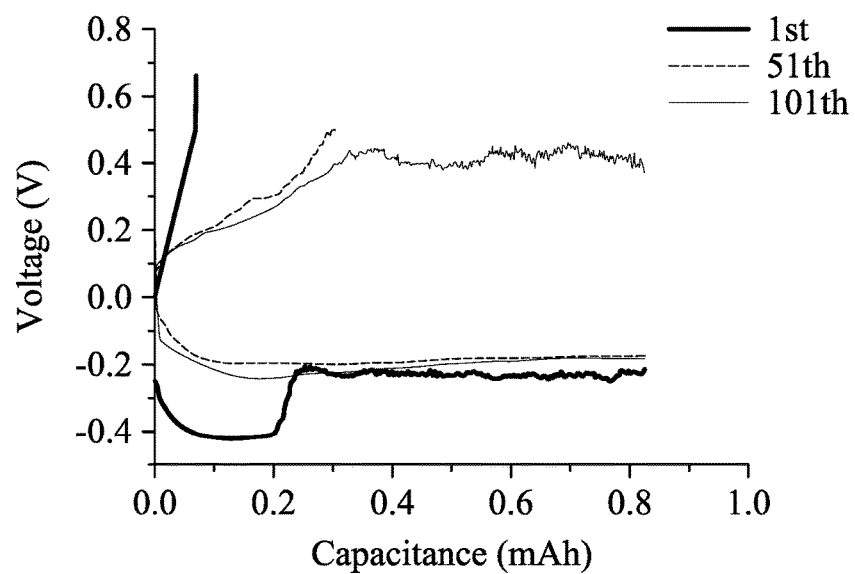
FIGS. 8A, 9A, and 10A show voltage-capacitance curves of batteries during plating/stripping tests in embodiments of the disclosure.
Figure 8B:
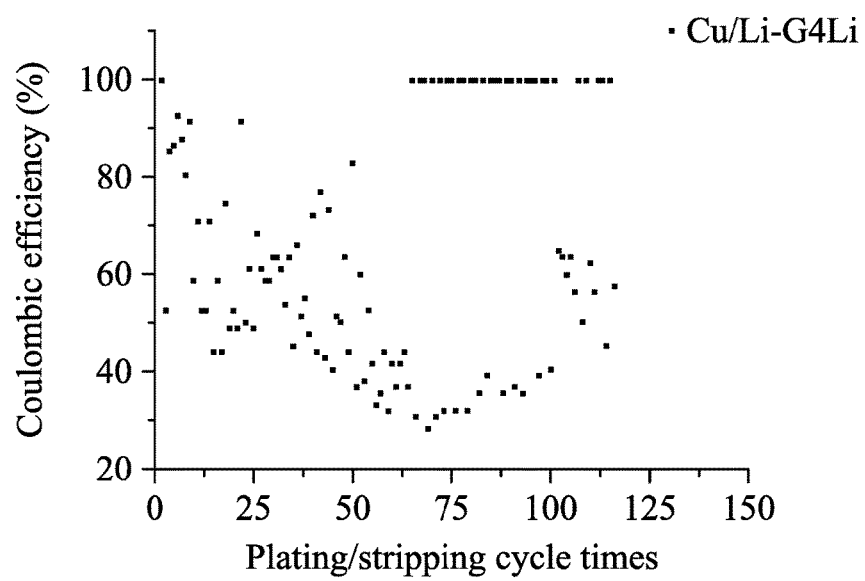
FIGS. 8B, 9B, and 10B show coulombic efficiency corresponding to plating/stripping cycle times of the batteries in embodiments of the disclosure.

2.22 g of TEGDME and 2.87 g of LiTFSI were mixed to form a liquid electrolyte. A separator film (2320, commercially available from Celgard) was disposed between a copper foil (serving as a positive electrode) and a lithium foil (serving as a negative electrode) to define a space. The liquid electrolyte was filled into the space to complete a battery. The battery was operated by a plating/stripping test (e.g. cut-off voltage of 0.5V, current of 7.12 mA, capacitance of 0.89 mAh, and temperature of 55° C.), and lithium dendrites and dead lithium were formed on the surface of the lithium foil. Therefore, the coulombic efficiency of the battery was low. FIG. 8A shows voltage-capacitance curves of the plating/stripping test, and FIG. 8B shows coulombic efficiency corresponding to plating/stripping cycle times.

Figure 9A:
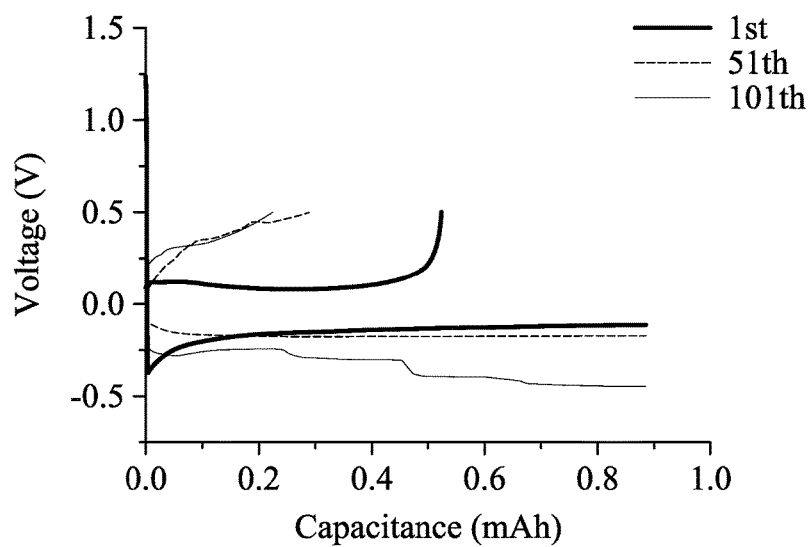
Figure 9B:
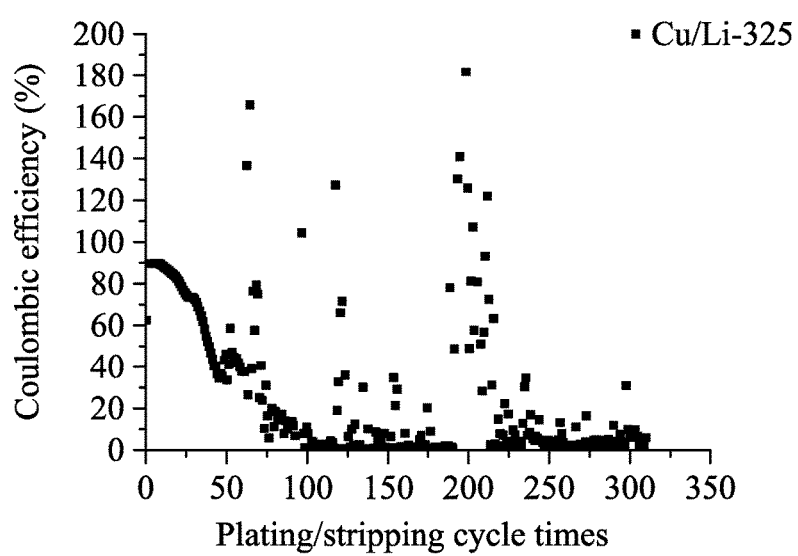

Alternatively, 1.1M $LiPF_6$ solution of a co-solvent of ethylene carbonate/propylene carbonate/diethyl carbonate (3/2/5, v/v/v) served as a liquid electrolyte. The separator film (2320, commercially available from Celgard) was disposed between a copper foil (serving as a positive electrode) and a lithium foil (serving as a negative electrode) to define a space, and the liquid electrolyte containing $LiPF_6$ was filled into the space to complete a battery. The battery was operated by a plating/stripping test (e.g. cut-off voltage of 0.5V, current of 7.12 mA, capacitance of 0.89 mAh, and temperature of 55° C.), and lithium dendrites and dead lithium were formed on the surface of the lithium foil. Therefore, the coulombic efficiency of the battery was low. FIG. 9A shows voltage-capacitance curves of the plating/stripping test, and FIG. 9B shows coulombic efficiency corresponding to plating/stripping cycle times.

Figure 10:
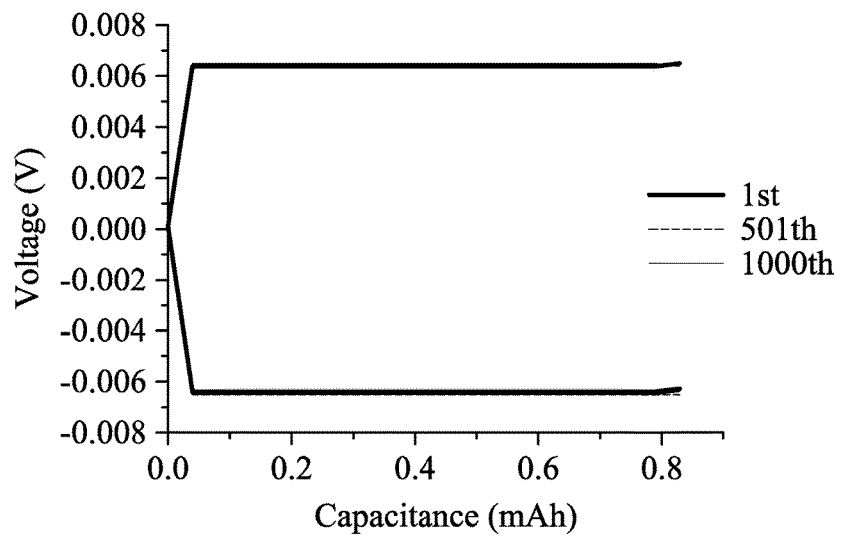
Figure 10:
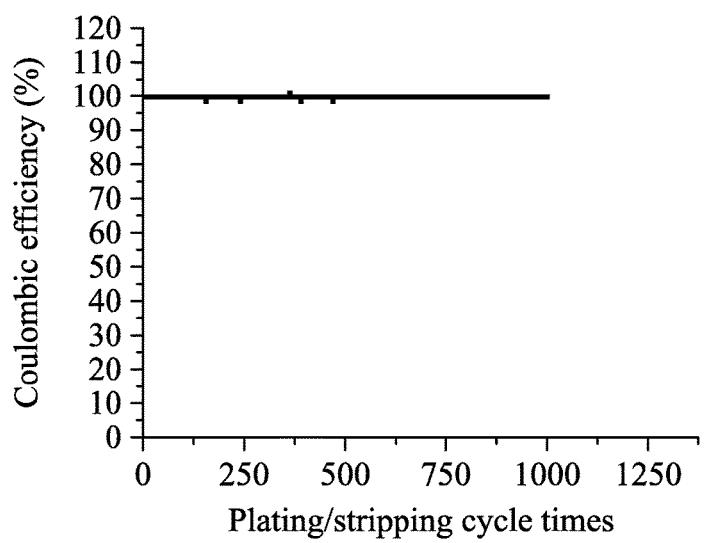

Alternatively, the composite electrolyte film in Example 1 (containing 40 parts by weight of the quasi solid state electrolyte and 60 parts by weight of $Li_7La_3Zr_2O_{12}$) was disposed between a copper foil (serving as a positive electrode) and a lithium foil (serving as a negative electrode) to form a battery. The battery was operated by a plating/stripping test (e.g. cut-off voltage of 0.5V, current of 7.12 mA, capacitance of 0.89 mAh, and temperature of 55° C.), the voltage-capacitance curve after 1000 times of charge/ discharge cycles was still stable (e.g. almost overlapping the voltage-capacitance curve after the first charge/discharge cycle). Moreover, the coulombic efficiency was close to 100% after 1000 times of charge/discharge cycles. FIG. 10A shows voltage-capacitance curves of the plating/stripping test, and FIG. 10B shows coulombic efficiency corresponding to plating/stripping cycle times.

Example 6

60 parts by weight of $Li_7La_3Zr_2O_{12}$ was mixed with polyvinylidene difluoride-co-hexafluoro propylene (PVDF-HFP, commercially available from Aldrich), centrifuged and washed, and then dried to obtain $Li-La_3Zr_2O_{12}$ with a surface modified by the polymer (PVDF-HFP). As shown in the result of the thermogravimetric analysis (TGA), the $Li_7La_3Zr_2O_{12}$ with a surface modified by the polymer (PVDF-HFP) included about 7 wt % of the polymer (PVDF-HFP). The $Li_7La_3Zr_2O_{12}$ with a surface modified by the polymer (PVDF-HFP) and 40 parts by weight of the quasi solid state electrolyte in Example 1 were mixed, and 7 parts by weight of the PTFE micropowder was then added to the mixture. The mixture was then roller-compacted into a composite electrolyte film with a thickness of 200 micrometers.

Figure 11:
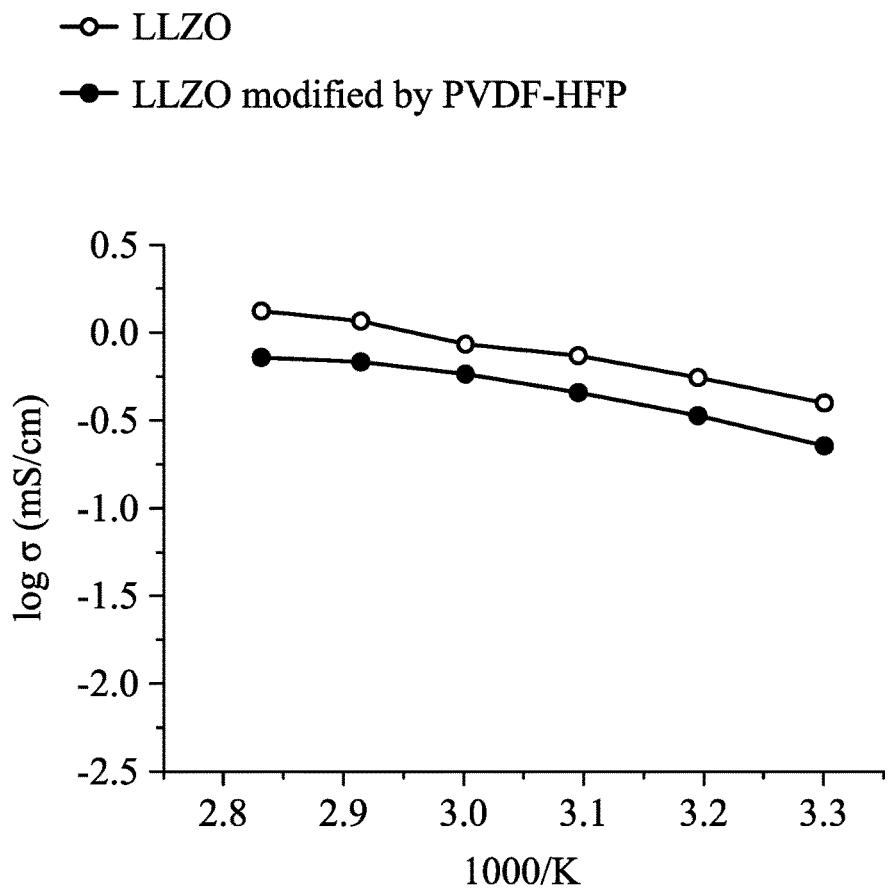
FIG. 11 shows plots of log σ versus 1000/K of composite electrolyte films in one embodiment of the disclosure.

The ionic conductivities (σ, mS/cm) of this composite electrolyte film at different temperatures (K) were measured to plot a line of log σ versus 1000/K of the composite electrolyte film, as shown in FIG. 11. In FIG. 11, the ionic conductivity of the composite electrolyte film containing the $Li_7La_3Zr_2O_{12}$ with a surface modified by the polymer (PVDF-HFP) was lower than the ionic conductivity of the composite electrolyte containing the $Li_7La_3Zr_2O_{12}$.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An electrolyte, comprising:
   (a) 100 parts by weight of oxide-based solid state inorganic electrolyte;
   (b) 20 to 70 parts by weight of $[Li(-OR^1)_n{}^-OR^2]Y$, wherein $R^1$ is $C_{1-4}$ alkylene group, $R^2$ is $C_{1-4}$ alkyl group, n is 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SO_2CF_3)_3^-$, $N(SO_2CF_3)_2^-$, $SCN^-$, $CF_3CF_2SO_3^-$, $C_6F_5SO_3^-$, $CF_3CO_2^-$, $SO_3F^-$, $B(C_6H_5)_4^-$, $CF_3SO_3^-$, or a combination thereof;
   (c) 1 to 10 parts by weight of nano oxide; and
   (d) 1 to 20 parts by weight of binder.

2. The electrolyte as claimed in claim 1, wherein the oxide-based solid state inorganic electrolyte comprises lithium lanthanum zirconium oxide, lithium lanthanum titanium oxide, lithium aluminum titanium phosphate, or a combination thereof.

3. The electrolyte as claimed in claim 1, wherein the nano oxide comprises silicon oxide, aluminum oxide, cerium oxide, titanium oxide, or a combination thereof.

4. The electrolyte as claimed in claim 1, wherein the binder comprises polyvinylidene difluoride, polytetrafluoroethylene, polyvinyl alcohol, polyethylene glycol, carboxymethyl cellulose, styrene-butadiene rubber, polyacrylate, polyacrylonitrile, or a combination thereof.

5. The electrolyte as claimed in claim 1, further comprising (e) 1 to 20 parts by weight of hyper-branched polymer, and the surface of the oxide-based solid state inorganic electrolyte is modified by the hyper-branched polymer.

6. The electrolyte as claimed in claim 5, wherein the hyper-branched polymer is formed by a cross-linking reaction of a prepolymer and a basic promoter, and the group and a precursor of a Lewis base.

7. The electrolyte as claimed in claim 6, wherein the precursor containing a maleimide functional group is:

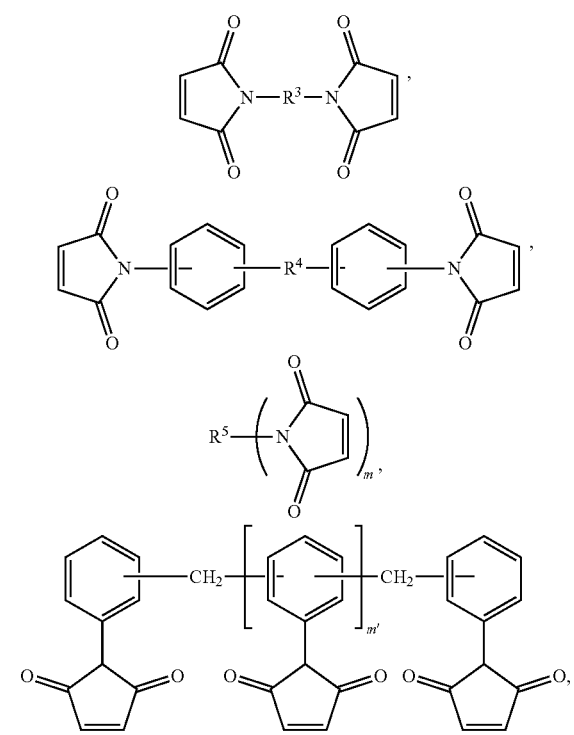

or a combination thereof,
wherein $R^3$ is $-CH_2NHCH_2-$, $-C_2H_4NHC_2H_4-$, $-C(O)CH_2-$, $-CH_2OCH_2-$, $-C(O)-$, $-O-$, $-S-$, $-S-S-$, $-S(O)-$, $-CH_2S(O)CH_2-$, $-(O)S(O)-$, $-CH_2(C_6H_4)CH_2-$, $-CH_2(C_6H_4)O-$, $-(CH_2CH(CH_3)O)-$, phenylene group, biphenylene group, $C_{2-8}$ alkylene group,

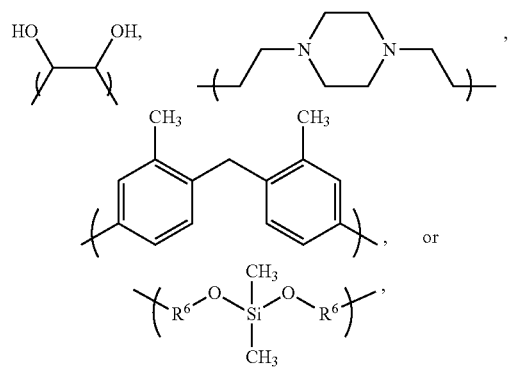

wherein each $R^6$ is independently $-(CH_2CH_2)O-$, phenylene group, or $C_{2-8}$ alkylene group,
wherein $R^4$ is $C_{2-8}$ alkylene group, $-C(O)-$, $-C(CH_3)_2-$, $-O-$, $-S-$, $-S-S-$, $-S(O)-$, $-(O)S(O)-$, or $-O(C_6H_4)C(CF_3)_2(C_6H_4)O-$, when m=3, $R^5$ is

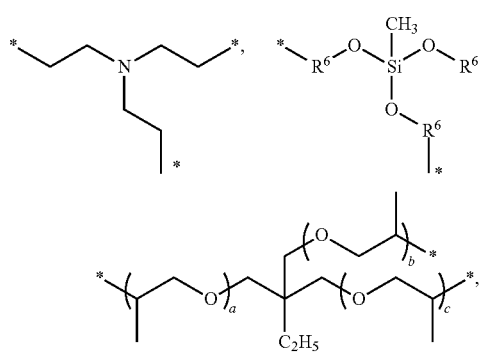

each $R^6$ is independently —$(CH_2CH_2)O$—, phenylene group, or $C_{2-8}$ alkylene group, a+b+c=5 or 6, and each of a, b, and c is greater than or equal to 1;

when m=4, $R^5$ is

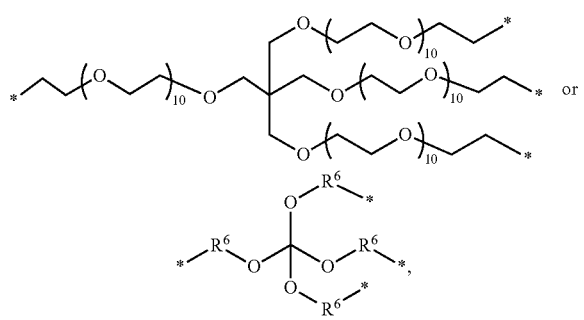

each $R^6$ is independently —$(CH_2CH_2)O$—, phenylene group, or $C_{2-8}$ alkylene group;

when m=8, $R^5$ is

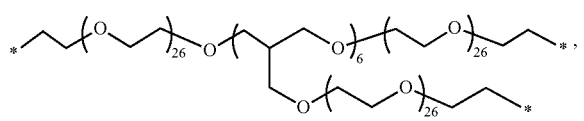

wherein m' is 2 to 5.

8. The electrolyte as claimed in claim 6, wherein the precursor of Lewis base has a structure of

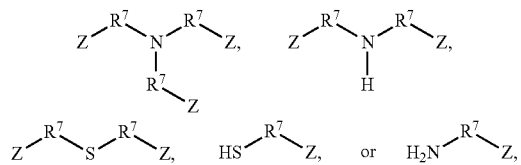

wherein Z is —SH or —$NH_2$, and $R^7$ is

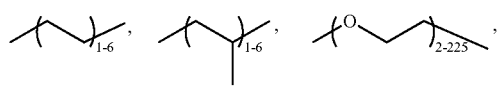

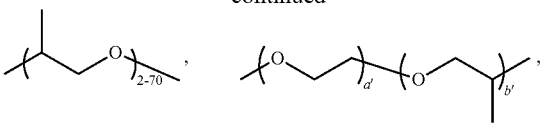

wherein a'+b'=45, or

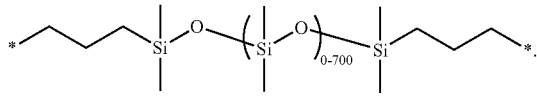

9. The electrolyte as claimed in claim 6, wherein the basic promoter has a structure of:

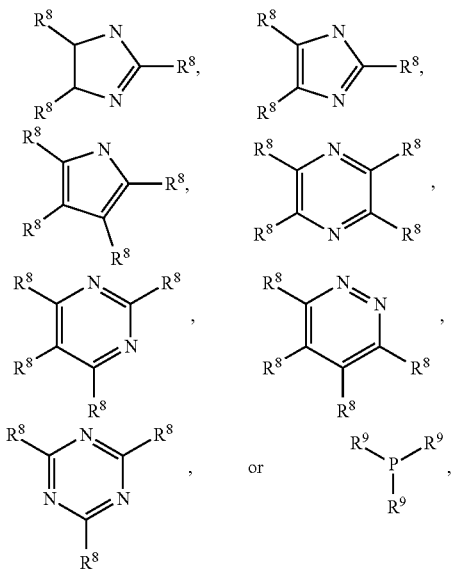

wherein each $R^8$ is independently H, alkyl group, alkenyl group, phenyl group, dimethylamino group, halogen, or —$NH_2$, and wherein each $R^9$ is independently alkyl group, alkenyl group, phenyl group, or halogen.

10. A battery, comprising:
a positive electrode;
a negative electrode; and
the electrolyte as claimed in claim 1 disposed between the positive electrode and the negative electrode.

11. The battery as claimed in claim 10, further comprising a gel type electrolyte covering a surface of the positive electrode, a surface of the negative electrode, or both the surface of the positive electrode and the surface of the negative electrode, wherein the gel type electrolyte comprises a hyper-branched polymer, a lithium salt, and a solvent.

12. The battery as claimed in claim 11, wherein the hyper-branched polymer is formed by a cross-linking reaction of a prepolymer and a basic promoter, and the prepolymer is formed by a reaction of a precursor containing a maleimide functional group and a precursor of a Lewis base.

13. The battery as claimed in claim 10, wherein the electrode is attached to the negative electrode, and an electrolyte liquid is disposed between the electrolyte and the positive electrode.

14. The battery as claimed in claim 13, further comprising a separator film disposed between the electrolyte and the negative electrode.

* * * * *